(12) United States Patent
Lee et al.

(10) Patent No.: US 9,204,659 B2
(45) Date of Patent: Dec. 8, 2015

(54) ROTARY FOOD CUTTER DEVICE

(71) Applicant: TSANN KUEN ZHANGZHOU, Fujian (CN)

(72) Inventors: Hei-Wang Lee, Fujian (CN); Chieh-Wen Lin, Fujian (CN); Wen-Xia Zhang, Fujian (CN)

(73) Assignee: TSANN KUEN (ZHANGZHOU) ENTERPRISE CO., LTD., Fujian (CN)

( * ) Notice: Subject to any disclaimer, the term of this patent is extended or adjusted under 35 U.S.C. 154(b) by 79 days.

(21) Appl. No.: 14/223,331

(22) Filed: Mar. 24, 2014

(65) Prior Publication Data

US 2014/0306047 A1    Oct. 16, 2014

(30) Foreign Application Priority Data

Apr. 12, 2013  (CN) .................... 2013 2 0185144 U

(51) Int. Cl.
| | |
|---|---|
| *A47J 43/07* | (2006.01) |
| *A23G 9/22* | (2006.01) |
| *A47J 43/00* | (2006.01) |
| *B02C 18/08* | (2006.01) |

(52) U.S. Cl.
CPC . *A23G 9/22* (2013.01); *A47J 43/00* (2013.01); *A47J 43/0722* (2013.01); *B02C 18/083* (2013.01); *A47J 43/07* (2013.01)

(58) Field of Classification Search
CPC ........... A47J 3/00; A47J 3/046; A47J 3/0722; A47J 3/0761
USPC .................... 241/92, 278.1; 99/510
See application file for complete search history.

(56) References Cited

U.S. PATENT DOCUMENTS

| | | | | | |
|---|---|---|---|---|---|
| 2,695,643 | A | * | 11/1954 | Aberer ............................ | 241/92 |
| 4,199,112 | A | * | 4/1980 | McLean .......................... | 241/92 |
| 4,610,398 | A | * | 9/1986 | Palazzolo ........................ | 241/92 |
| 5,340,036 | A | * | 8/1994 | Riley ............................... | 241/56 |
| 5,960,709 | A | * | 10/1999 | Yip .................................. | 99/510 |
| 6,027,055 | A | * | 2/2000 | Doskocil ......................... | 241/55 |
| 7,066,416 | B2 | * | 6/2006 | Reinhold ......................... | 241/55 |
| 7,798,436 | B2 | * | 9/2010 | Cornelius ........................ | 241/55 |
| 8,122,820 | B2 | * | 2/2012 | Conti et al. ..................... | 99/509 |
| 2005/0023388 | A1 | * | 2/2005 | Reinhold ......................... | 241/92 |
| 2007/0210193 | A1 | * | 9/2007 | Larsen ............................. | 241/92 |
| 2014/0131493 | A1 | * | 5/2014 | Lee et al. ........................ | 241/92 |

* cited by examiner

*Primary Examiner* — Faye Francis
(74) *Attorney, Agent, or Firm* — Hamre, Schumann, Mueller & Larson, P.C.

(57) ABSTRACT

A rotary food cutter device includes a rotary disc and a plurality of spaced-apart cutters disposed on the rotary disc. Each of the cutters has a blade. The rotary disc has a plurality of discharge openings each located at a side of and adjacent to the blade of a respective one of the cutters, and a plurality of bump groups. Each of the bump groups is located at a side of and adjacent to the respective one of the cutters, and includes a plurality of spaced-apart bumps extending from a top surface of the rotary disc.

11 Claims, 4 Drawing Sheets

ROTARY FOOD CUTTER DEVICE

CROSS-REFERENCE TO RELATED APPLICATION

This application claims priority of Chinese Application No. 201320185144.X, filed on Apr. 12, 2014.

BACKGROUND OF THE INVENTION

1. Field of the Invention

This invention relates to a food cutter device, and more particularly to a rotary cutter device applicable to a fruit ice cream machine.

2. Description of the Related Art

A conventional fruit ice cream machine includes a rotary disc and a plurality of cutters. Each of the cutters has blade that is spaced apart from a top surface of the rotary disc along a direction parallel to a rotating axis of the rotary disc by only a relatively small distance. As such, frozen lumps are stuck easily on the blades of the cutters, and cannot drop from the rotary disc, thereby interrupting the cutting process. In this state, when it is desired to proceed the cutting process, the frozen lumps stuck must be removed from the blades. This results in inconvenience during use and a reduction in the cutting efficiency.

SUMMARY OF THE INVENTION

The object of this invention is to provides rotary food cutter device that can be operated smoothly and that is convenient to use.

According to this invention, a rotary food cutter device includes a rotary disc and a plurality of spaced-apart cutters disposed on the rotary disc. Each of the cutters has a blade. The rotary disc has a plurality of discharge openings each located as a side of and adjacent to the blade of a respective one of the cutters, and a plurality of bump groups. Each of the bump groups is located at a side of and adjacent to the respective one of the cutters, and includes a plurality of spaced-apart bumps extending from a top surface of the rotary disc.

Due to the inclusion of the bumps in the rotary disc, when the cutter device is used in a fruit ice cream machine, frozen lumps can be broken by the bumps before they move onto the cutters, so as so pass through the discharge openings.

BRIEF DESCRIPTION OF THE DRAWINGS

These and other features and advantages of this invention will become apparent in she following detailed description of the preferred embodiments of this invention, with reference to the accompanying drawings, in which.

DETAILED DESCRIPTION OF THE PREFERRED EMBODIMENTS

Figure 1:
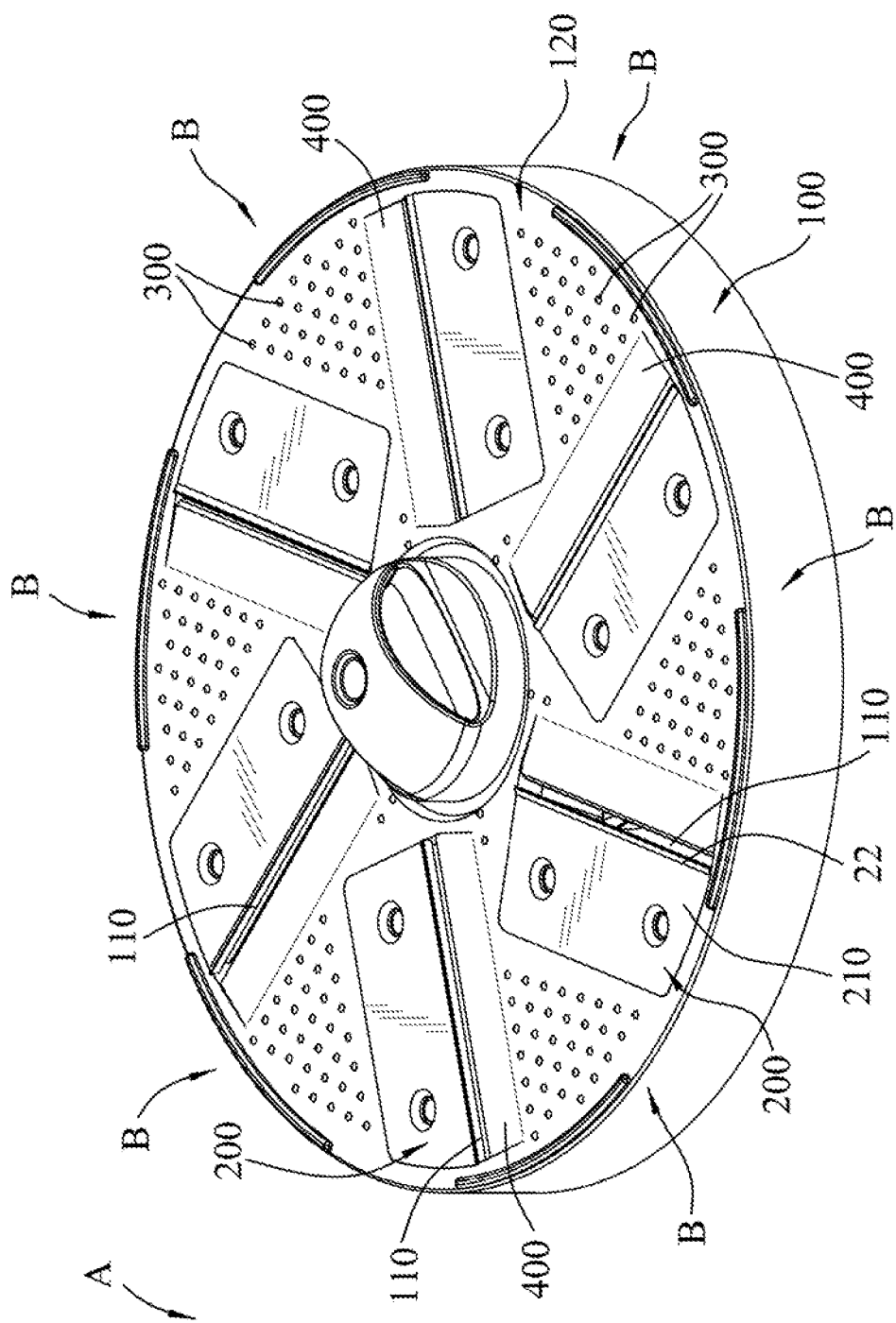
FIG. 1 is a perspective view of the first preferred embodiment of a rotary food cutter device according to this invention.

Before the present invention is described in greater detail in connection with the preferred embodiments, it should be noted that similar elements and structures are designated by like reference numerals throughout the entire disclosure.

Figure 2:
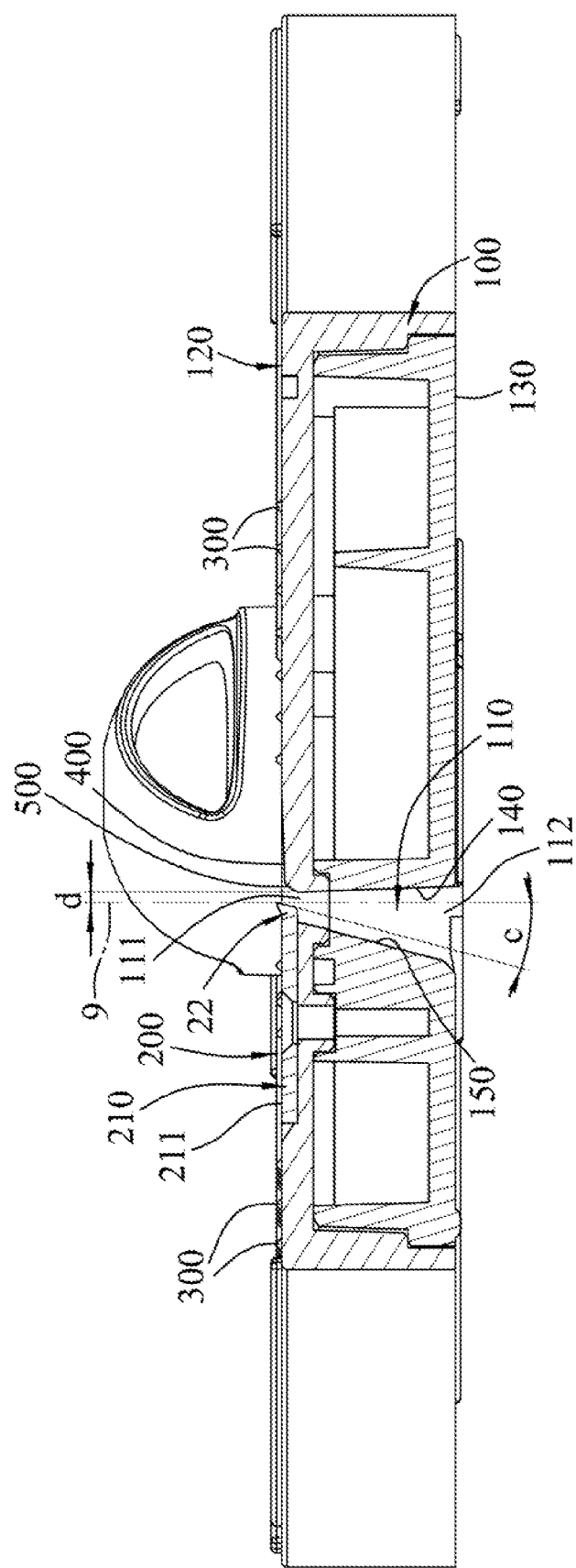
FIG. 2 is a schematic sectional view of the first preferred embodiment.
Figure 3:
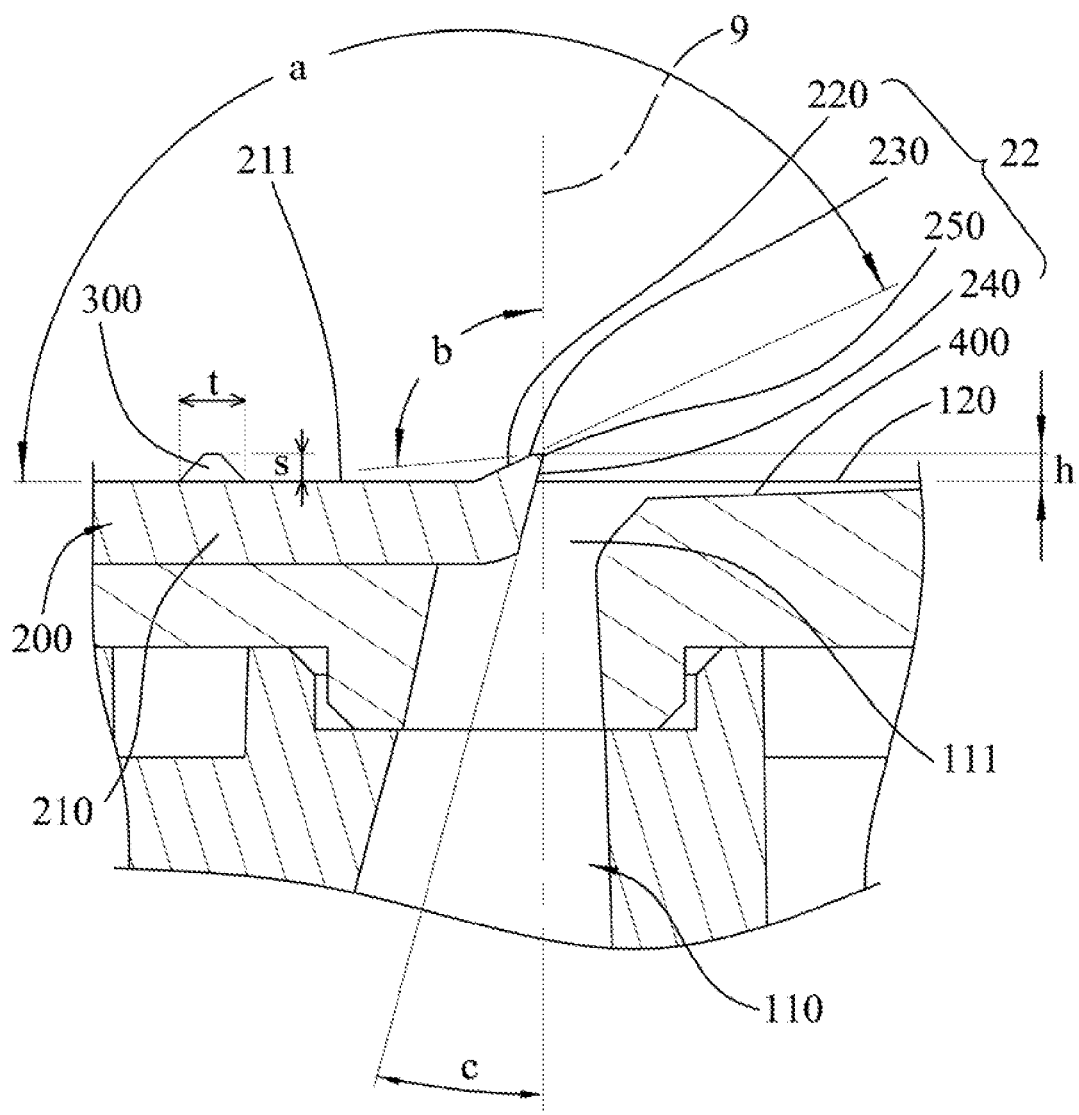
FIG. 3 is an enlarged view of a portion of FIG. 2.

Referring to FIGS. 1, 2, and 3, the first preferred embodiment of a rotary food cutter device according to this invention includes a rotary disc 100 and a plurality of angularly equidistant cutters 200 disposed on the rotary disc 100.

The rotary disc 100 has a plurality of angularly equidistant discharge openings 110 extending through flat top and bottom surfaces 120, 130 of the rotary disc 100.

A plurality of imaginary axes 9 (only one is shown in FIG. 3) are defined to extend respectively through the discharge openings 110, and are perpendicular to the top surface 120 of the rotary disc 100.

In this embodiment, the rotary disc 100 further has a plurality of flat inner wall surfaces 140 (only one is shown in FIG. 2) perpendicular to the top surface 120 of the rotary disc 100 and each defining a side of the corresponding discharge opening 110, and plurality of inclined wall surfaces 150 (only one is shown in FIG. 2) inclined relative to the top surface 120 of the rotary disc 100 and each defining an opposite side of the corresponding discharge opening 110. Each discharge opening 110 has a top end 111, a bottom end 112, and a width that is increased gradually in a downward direction.

In this embodiment, the rotary disc 100 is sleeved fixedly on a rotating shaft (not shown) that can be driven electrically to rotate the rotary disc 100 in a direction (A) (see FIG. 1), and further has a plurality of bump groups (B) (see FIG. 1), each of which is located at a side of and adjacent to the corresponding cutter 200, such that frozen lumps are broken thereby just before they move onto the corresponding cutter 200. Each bump group (B) includes a plurality of spaced-apart bumps 300 extending from the top surface 120 of the rotary disc 100.

In this embodiment, any two adjacent bumps 300 of each bump group (B) are spaced apart from each other by a distance of 3-10 mm, the width (t) of a bottom end of each bump 300 is 0.5-2.5 mm, and the height (s) of each bump 300 is 0.5-2 mm.

In this embodiment, each bump 300 is shaped as a truncated cone or a truncated elliptical cone, and has a flat top surface parallel to the top surface 120 of the rotary disc.

It should be noted that, if the frozen lumps have ice top layers the ice top layers will be broken by the bumps 300 before they move into the discharge openings 110, so as to prevent the frozen lumps from being stuck on the cutters 200, thereby enhancing smooth operation of the rotary cutter device and resulting in convenience during use. In this embodiment, each cutter 200 is disposed on the rotary disc 100, and has a blade 250. Each bump group (B) is disposed immediately upstream of one of the cutters 200 along the direction (A), and is located at a side of the one cutter 200 distal from the corresponding blade 250. The blade 250 of each cutter 200 is located directly above the corresponding discharge opening 110.

In this embodiment, the number of the cutters 200 is six. If necessary, the number of the cutters 200 may be changed, e.g., to five, seven, or eight. The more the number of the cutters the higher the cutting efficiency is.

In this embodiment, each cutter 200 further has: a connecting portion 210 connected fixedly to the rotary disc 100 and having a flat top surface 211 parallel to the top surface 120 of the rotary disc 100; and a cutting portion 22 connected integrally to the connecting portion 210, the cutting portion 22 including a first flat surface 220 extending inclinedly from the top surface 211 of the connecting portion 210 to form an obtuse angle (a) therebetween, a second flat surface 230 extending from a side of the first flat surface 220 to form an obtuse angle (b) therebetween, and a third flat surface 240 extending from a side of the second flat surface 230 to form an acute angle (c) therebetween.

The blade 250 of each cutter 200 is disposed at a junction between the second and third flat surfaces 230, 240 of the cutting portion 22 of the corresponding cutter 200.

In this embodiment, the obtuse angle (a) between the first flat surface 220 and the top surface 211 of the connecting portion 210 of each cutter 220 is 130-160 degrees.

In this embodiment the second flat surface 230 of each cutter 200 forms an angle of 20-100 degrees with respect to the imaginary axis 2.

In this embodiment, the third flat surface 240 of each cutter 200 forms an angle of 5-30 degrees with respect to the imaginary axis 2.

In this embodiment, the second and third flat surfaces 230, 240 of each cutter 200 are interconnected along a connecting line (i.e., the blade 250) that is spaced apart from the top surface 120 of the rotary disc 100 along a direction perpendicular to the top surface 120 of the rotary disc 100 by a distance (h) of 0.5-2.5 mm.

In this embodiment, each blade 230 is spaced apart from the corresponding inner well surface 140 along a direction parallel to the top surface 120 of the rotary disc 100 by a distance (d) of 1-3 mm.

In this embodiment, the rotary disc 100 further has a plurality of inclined surfaces 400 each disposed below and extending inclinedly from a portion of the top surface 120 toward a respective cutter 200, and a plurality of curved surfaces 500 each connected between a respective inclined surface 400 and a respective inner wall surface 140. Each inclined surface 400 is disposed between an adjoining discharge opening 110 and an adjoining bump group (B). The inclined surfaces 400 cooperate with the curved surfaces 500 to facilitate the frozen lumps to drop into the discharge openings 110. As such, the operating efficiency of the rotary cutter device can be promoted, and the frozen lumps can be prevented from being stuck on the blades 250.

It should be noted that, the number of the discharge openings 110 corresponds to that of the cutters 200 and that of the inclined surfaces 400.

Figure 4:
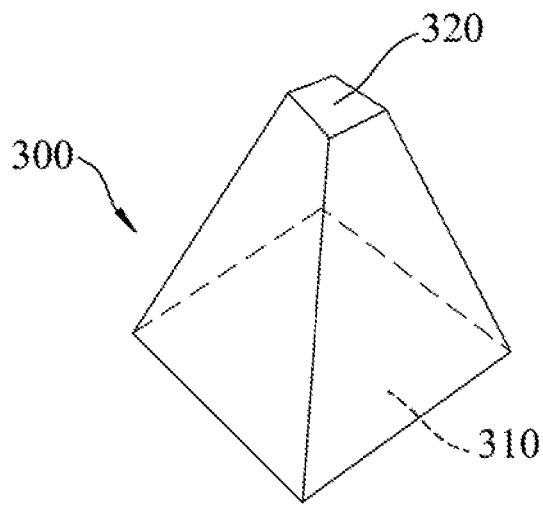
FIG. 4 is a perspective view of a bump of the second preferred embodiment of a rotary food cutter device according to this invention.
Figure 5:
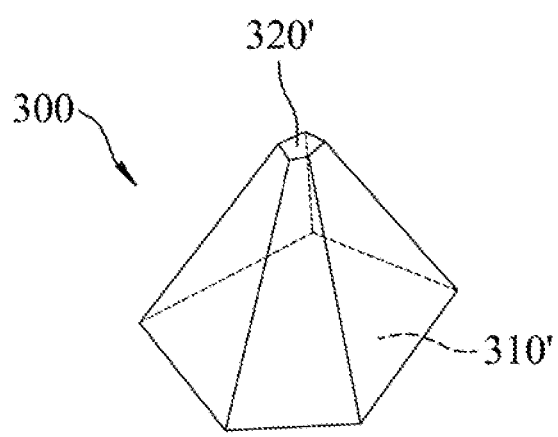
FIG. 5 is a perspective view of a bump of the third preferred embodiment of a rotary food cutter device according to this invention.

Each bump 300 may be modified to be shaped as a truncated rhombic cone 310 (see FIG. 4) having a flat top surface 320 (see FIG. 4), or a truncated polygonal cone 310' (see FIG. 5) having a flat top surface 320' (see FIG. 5).

With this invention thus explained, it is apparent that numerous modifications and variations can be made without departing from the scope and spirit of this invention. It is therefore intended that this invention be limited only as indicated by the appended claims.

We claim:

1. A rotary food cutter device comprising a rotary disc and a plurality of spaced-apart cutters disposed on said rotary disc, each of said cutters having a blade, said rotary disc having a plurality of discharge opening each located at a side of and adjacent to said blade of a respective one of said cutters, and a plurality of bump groups, each of said bump groups being located at a side of and adjacent to said respective one of said cutters and including a plurality of spaced-apart bumps that extend from a top surface of said rotary disc.

2. The rotary food cutter device as claimed in claim 1, wherein each of said bumps is shaped as one of a truncated elliptical cone, a truncated cone, a truncated rhombic cone, and a truncated polygonal cone.

3. The rotary food cutter device as claimed in claim 2, wherein any two adjacent ones of said bumps of each of said bump groups are spaced part from each other by a distance of 3-10 mm, a width of a bottom end of each of said bumps is 0.5-2.5 mm, and a height of each of said bumps is 0.5-2 mm.

4. The rotary food cutter device as claimed in claim 1, wherein any two adjacent ones of said bumps of each of said bump groups are spaced part from each other by a distance of 3-10 mm, a width of a bottom end of each of said bumps is 0.5-2.5 mm, and a height of each of said bumps is 0.5-2 mm.

5. The rotary food cutter device as claimed in claim 1, wherein said rotary disc further has a plurality of inclined surfaces each disposed between said respective one of said discharge openings ends respective one of said bump groups.

6. The rotary food cutter device as claimed in claim 1, wherein each of said cutters further has a connecting portion connected fixedly to said rotary disc and having a flat top surface, and a cutting portion connected integrally to said connecting portion, such that said cutting portion includes a first flat surface extending inclinedly from said top surface of said connecting portion to form an obtuse angle therebetween, a second flat surface extending from a side of said first flat surface to form an obtuse angle therebetween, and a third flat surface extending from a side of said second flat surface to form an acute angle therebetween, said blade of each of said cutters being disposed at a junction between said second and third flat surfaces of said cutting portion of a corresponding one of said cutters.

7. The rotary food cutter device as claimed in claim 6, where in said obtuse angle between said first flat surface and said top surface of said connecting portion of each of said cutters is 130-160 degrees.

8. The rotary food cutter device as claimed in claim 7, wherein each of said second flat surfaces of said cutters forms an angle of 90-100 degrees with respect to an imaginary axis extending through a corresponding one of said discharge openings and perpendicular to said top surface of said rotary disc.

9. The rotary food cutter device as claimed in claim 8, wherein said third flat surface of each of said cutters forms an angle of 5-30 degrees with respect to said imaginary axis.

10. The rotary food cutter device as claimed in claim 9, wherein said second and third flat surfaces of each of said cutters are interconnected along a connecting line that is spaced apart from said top surface of said rotary disc along a direction perpendicular to said top surface of said rotary disc by a distance of 0.5-2.5 mm.

11. The rotary food cutter device as claimed in claim 5, wherein said rotary disc further has a plurality of flat inner wall surfaces each defining a side of a corresponding one of said discharge openings, said second and third flat surfaces of each of said cutters are interconnected along a connecting line that is spaced apart from a corresponding one of said inner wall surfaces along a direction parallel to said top surface of said rotary disc by a distance of 1-3 mm.

* * * * *